United States Patent
Berggren et al.

(10) Patent No.: US 11,363,556 B2
(45) Date of Patent: Jun. 14, 2022

(54) METHOD FOR REPORTING OF POSITIONING DATA

(71) Applicant: SONY MOBILE COMMUNICATIONS INC, Tokyo (JP)

(72) Inventors: Anders Berggren, Lund (SE); Basuki Priyanto, Lund (SE)

(73) Assignee: SONY GROUP CORPORATION, Tokyo (JP)

( * ) Notice: Subject to any disclaimer, the term of this patent is extended or adjusted under 35 U.S.C. 154(b) by 172 days.

(21) Appl. No.: 16/637,745

(22) PCT Filed: Jul. 23, 2018

(86) PCT No.: PCT/SE2018/050773
§ 371 (c)(1),
(2) Date: Feb. 8, 2020

(87) PCT Pub. No.: WO2019/039983
PCT Pub. Date: Feb. 28, 2019

(65) Prior Publication Data
US 2020/0200916 A1 Jun. 25, 2020

(30) Foreign Application Priority Data
Aug. 21, 2017 (SE) .................. 1730223-3

(51) Int. Cl.
*H04W 64/00* (2009.01)
*G01S 19/39* (2010.01)
(Continued)

(52) U.S. Cl.
CPC ........... *H04W 64/00* (2013.01); *G01S 5/0036* (2013.01); *G01S 5/0263* (2013.01); *G01S 5/0294* (2013.01);
(Continued)

(58) Field of Classification Search
CPC .... H04W 64/00; G01S 19/396; G01S 5/0036; G01S 5/0263; G01S 5/10
(Continued)

(56) References Cited

U.S. PATENT DOCUMENTS 9,400,930 B2    7/2016   Moeglein et al.
9,494,432 B2   11/2016   Pakzad et al.
(Continued)

FOREIGN PATENT DOCUMENTS

CN    102680996 A    9/2012
CN    104471694 A    3/2015
(Continued)

OTHER PUBLICATIONS

International Search Report from corresponding International Patent Application No. PCT/SE2018/050773, dated Oct. 18, 2018, 3 pages.
(Continued)

*Primary Examiner* — Harry K Liu
(74) *Attorney, Agent, or Firm* — Tucker Ellis LLP

(57) ABSTRACT

Method for providing positioning data in a positioning node of a radio network, which positioning data is associated with a mobile device including a radio unit, the method comprising the steps of establishing a radio session for receiving positioning data in the positioning node from the radio unit; transmitting report control data to the radio unit, wherein the report control data identifies a request to report positioning data obtained in the device, wherein said positioning data includes inertial measurement data; and receiving positioning data from the radio unit in accordance with the report control data.

20 Claims, 4 Drawing Sheets

(51) Int. Cl.
*G01S 5/00* (2006.01)
*G01S 5/02* (2010.01)
*G01S 5/10* (2006.01)
*G01S 19/07* (2010.01)
*G05D 1/00* (2006.01)

(52) U.S. Cl.
CPC ............. *G01S 5/10* (2013.01); *G01S 19/07* (2013.01); *G01S 19/393* (2019.08); *G01S 19/396* (2019.08); *G05D 1/0038* (2013.01)

(58) Field of Classification Search
USPC ..................................................... 342/357.32
See application file for complete search history.

(56) References Cited

U.S. PATENT DOCUMENTS

| | | | |
|---|---|---|---|
| 2005/0278371 A1* | 12/2005 | Funk | G06F 16/29 |
| 2008/0248815 A1* | 10/2008 | Busch | G06Q 30/0261 |
| | | | 455/456.5 |
| 2010/0190449 A1 | 7/2010 | Suzuki | |
| 2012/0232792 A1 | 9/2012 | Ding et al. | |
| 2012/0262335 A1 | 10/2012 | Holcman et al. | |
| 2012/0302257 A1* | 11/2012 | Zhang | G01S 5/0263 |
| | | | 455/456.2 |
| 2013/0196681 A1* | 8/2013 | Poduri | H04W 64/00 |
| | | | 455/456.1 |
| 2014/0064126 A1* | 3/2014 | Lim | G01S 5/0257 |
| | | | 370/252 |
| 2015/0105097 A1 | 4/2015 | Sun et al. | |
| 2016/0255463 A1 | 9/2016 | Das et al. | |
| 2017/0135020 A1 | 5/2017 | Kapoulas et al. | |
| 2018/0106618 A1* | 4/2018 | Cerchio | G01S 5/0252 |

FOREIGN PATENT DOCUMENTS

| | | |
|---|---|---|
| JP | 2016540186 A | 6/2016 |
| KR | 10-2014-23421 A | 2/2014 |
| KR | 10-2015-30718 A | 3/2015 |
| KR | 10-2016-73723 A | 6/2016 |
| WO | 2011083801 A1 | 7/2011 |
| WO | 201318871 A2 | 12/2013 |
| WO | 2016186545 A1 | 11/2016 |

OTHER PUBLICATIONS

Zaher, Kassas M. et al: "LTE Steers UAV", GPS World vol. 28, No. 4, Apr. 3, 2017, 9 pages.
Mazur, Alexander et al: "Autonomous operation and control of a Multirotor Unmanned Aerial Vehicle through 4G LTE using onboard GPS and image processing", Faculty of Engineering, Computing and Mathematics, The Univeristy of Western Australia; Oct. 1, 2014, 23 pages.
Swedish Search Report from corresponding Swedish Application No. 1730223-3, dated Mar. 22, 2018, 2 pages.
Korean Office Action dated Mar. 23, 2022 for Application Serial No. 10-2020-7007895 (5 pages).
Japanese Written Opinion dated Feb. 16, 2022 for Application Serial No. 2020-510588 (3 pages).

* cited by examiner

METHOD FOR REPORTING OF POSITIONING DATA

TECHNICAL FIELD

This disclosure relates to methods for reporting positioning data from a mobile device to radio network, usable for positioning of such a mobile device, and to devices operating such a method. Various aspects relate to adaptive reporting of different types of positioning data dependent on factors related to mobility, accuracy and latency.

BACKGROUND

Radio systems and the use of radio for communication or control of a radio terminal is a well-established area of technology, spanning several different fields of application. In the most dominating type of radio communication systems, a network of radio stations is operated to setup a radio link with a mobile radio terminal, or terminal for short, allowing the terminal to move around while intermittently or continuously communicating with the network. Cellular-based systems are designed to provide connection possibility in different areas, or cells, covered by respective base stations, which are configured to support hand over operation and maintain connection with a terminal as it moves from one cell to another. Present examples of such systems include e.g. LTE, Long-Term Evolution, as specified under the 3GPP, $3^{rd}$ Generation Partnership Project. Other systems include WLAN, Wireless Local Area Networks, where at least one AP, Access Point, may provide connection to a terminal present within a range of connection with that AP. As an example, IEEE defines such systems under standards 802.11, commonly referred to as wifi. Another system is 5G New Radio (NR) that is currently being specified. However, various other well-known types of radio systems exist, based on a corresponding setup as LTE, NR, and wifi, and will generally be referred to herein as radio communication networks, or radio networks for short.

For different applications, positioning of devices is a desirable feature. In this context, positioning is intended to involve gaining knowledge of a present position of a device. One well-known technology is the use of satellite-based positioning, where time-coded signals from a plurality of satellites are received by a signal receiver in the device to position. The received signals are subsequently used to calculate a position, e.g. including triangulation. GNSS, Global Navigation Satellite System, is the standard generic term for satellite navigation systems that provide such autonomous geo-spatial positioning with global coverage, where dedicated satellites act as remote positioning data transmitters. The general term GNSS includes e.g. the GPS, GLONASS, Galileo, Beidou and other regional systems. The device may carry out the positioning calculations by itself, or report the received signals as positioning data to a different unit, where the positioning, i.e. position or location calculations, is carried out. Radio terminals for operation in a radio network may include GNSS signal receivers, and potentially positioning calculation units, for positioning. In various fields of operation, though, such satellite signals will be difficult to detect, such as in indoor conditions and urban areas. For this and other reasons, several types of positioning techniques within an actual radio network have been developed. One type of radio network positioning includes measurement of reception of signals directly from a plurality of base stations of a radio network, acting as remote positioning data transmitters. An example of such a system defined by 3GPP is OTDOA, Observed Time Difference Of Arrival, and involves a triangulation technique involving base stations within signal detection reach of a radio terminal. Each base station transmits dedicated PRS, positioning reference signals. In LTE system, the PRS signals sequence generation and resource mapping are defined in 3GPP TS 36.211 specification. The PRS signal from multiple base stations are detected by the radio device and established positioning data, i.e. measurement results, is reported to a positioning node, such as a positioning server E-SMLC, Enhanced Serving Mobile Location Center, via a serving base station. The actual positioning, based on the positioning data, is normally carried out in the network, i.e. in the positioning server.

SUMMARY

Positioning to obtain a fix point of location for a mobile device, for example a position as in a geographic coordinate system, or a succession of fix points to determine speed, direction and even a trajectory, may be obtained by different state of the art methods, such as by means of GNSS or OTDOA. For certain types of mobile devices, or in certain scenarios, a more accurate and/or faster method of positioning may be desirable. This may for instance be required for determining rapid movement of a mobile device, including acceleration as well as directional or rotational changes.

There are many types of mobile devices that may require improved positioning, and one example is unmanned vehicles. In this context, an unmanned vehicle is a mobile device which need not be controlled by an onboard user. Such unmanned vehicles may include land-roaming vehicles, ships, and aerial vehicles. Such unmanned aerial vehicles (UAV) are often also referred to as drones. An unmanned vehicle may be guided by remote control or onboard computers, but may potentially also carry onboard passengers.

Various solutions are outlined herein, targeting positioning of mobile devices, of which unmanned vehicles are outlined as one example. In addition, methods and devices for positioning are disclosed for other types of devices, employing such solutions.

In accordance with a first aspect, a method is disclosed for providing positioning data in a positioning node of a radio network, which positioning data is associated with a mobile device including a radio unit, the method comprising the steps of establishing a radio session for receiving positioning data in the positioning node from the radio unit;

transmitting report control data to the radio unit, wherein the report control data identifies a request which controls the mobile device to record inertial measurement data obtained in the mobile device, and to report positioning data including the inertial measurement data;

receiving positioning data from the radio unit in accordance with the report control data.

The proposed solution provides an opportunity to directly control a mobile device to record and report inertial measurement data, which may be used for calculation of a position, direction or speed of the mobile device, in a positioning node or control station. This may e.g. provide additional accuracy and enhanced information related to a determined position as otherwise based on fix positioning using signals received from remote positioning data transmitters, including any of speed, heading, and calculated positions between established fix positions.

In one embodiment, the received positioning data includes timestamp data associated with the inertial measurement data, for correlation of the inertial measurement data with fix positioning data.

In one embodiment, the method comprises the step of transmitting a position indication including or based on the received position data to a control center associated with the device. The position indication may include positioning or location information including a fix position and/or inertial measurement raw data.

In one embodiment, said report control data identifies an interval for the mobile device to obtain or report at least the inertial measurement data.

In one embodiment, the method comprises the steps of
determining a parameter level associated with mobility of the mobile device, based on the received positioning data;
wherein said report interval is set based on the determined parameter level.

In various embodiments, there may be certain requirements on e.g. accuracy and/or latency that depends on e.g. mobility. One parameter may also indicate whether the control center is only monitoring the location of the mobile device, or using the positioning data for maneuvering the mobile device. A parameter level related to latency may thus related to a detected lag between maneuvering and monitored changes in the mobile device as caused by the maneuvering.

In one embodiment, the method comprises the step of
receiving an indication of said report interval from said control center.

In one embodiment, the method comprises the steps of
receiving a request for user plane connection from the control center;
setting up a user plane connection between the radio unit and the control center.

In one embodiment, the method comprises the steps of
receiving control data from the control center, which control data relates to latency associated with calculating a position based on the received positioning data;
setting up a user plane connection between the radio unit and the control center in response to receiving said control data. The user plane connection may be set up under control of the positioning node, but subsequent data communication in the user plane connection is typically carried out without passing or involving the positioning node.

In one embodiment, said report control data identifies
a first interval for reporting fix positioning data obtained in the device from a remote positioning data transmitter, and
a second interval for reporting inertial measurement data.

According to a second aspect, a positioning node in a radio network is disclosed, configured for providing positioning data associated with a device including a radio unit, the positioning device comprising
a control unit including
a processing device, and
a memory storing computer program code;
wherein the processing device is configured to execute said computer program code to carry out the any of the steps of the preceding method steps.

According to a third aspect, a mobile device for communication with a radio communication network is disclosed, comprising
a radio unit,
a receiver for receiving fix positioning data from a remote positioning data transmitter,
a data collecting unit connected to a sensor for obtaining inertial measurement data associated with movement of the device,
a control unit including
a processing device, and
a memory storing computer program code;
wherein the control unit is configured to execute the computer program code to establish at least one timestamp, for correlating the fix positioning data and the inertial measurement data.

In one embodiment, the radio unit is configured to transmit positioning data including at least said inertial measurement data together with the established timestamp to a positioning unit in the network.

In one embodiment, the radio unit is configured to transmit positioning data in accordance with report control data, identifying a request for positioning data, received in the radio unit.

In one embodiment, the mobile device is an unmanned vehicle.

BRIEF DESCRIPTION OF THE DRAWINGS

Various embodiments of the invention will be described below with reference given to the drawings, in which FIG. 1 schematically illustrates system including a mobile device and a radio network with a plurality of base stations in accordance with an embodiment.

DETAILED DESCRIPTION

Figure 1:
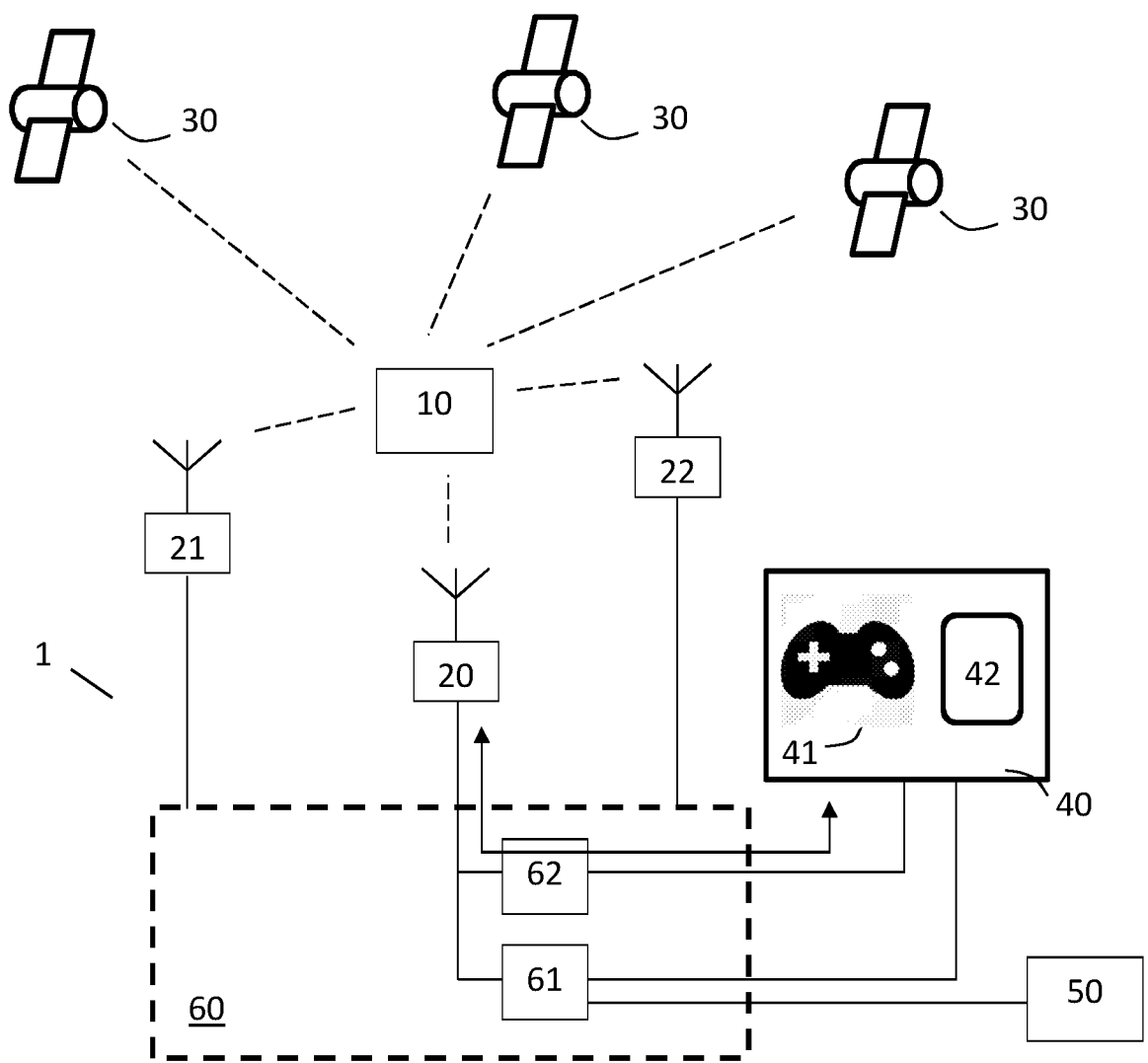

The detailed description set forth below, wherein reference is made to the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Aspects of the embodiments presented herein are disclosed with reference to various apparatus and methods. These apparatus and methods are described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system. By way of example, an element, or any portion of an element, or any combination of elements may be implemented with a "processing system" that includes one or more processors.

Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. Software in any such form may be stored in a memory, such as a non-volatile memory, forming part of or being connected to the processing system.

Within 3GPP a work item for Rel-15 relates to "UE Positioning Accuracy Enhancements for LTE", with an objective to specify solutions for positioning enhancements in LTE in respect of positioning accuracy, availability, reliability and scalability, for both normal UEs and BL UEs. In the LTE context, UE denotes User Equipment, a term for radio devices operable to communicate in the system, and BL denotes Bandwidth reduced Low complexity. These discussions relate inter alia to the objective to specify support for IMU, Inertial Measurement Unit, positioning. This includes signaling and procedure to support IMU positioning over LPP, LTE Positioning Protocol, and hybrid positioning including IMU related estimates.

An IMU is an electronic device that measures and reports a body's specific force, angular rate, and sometimes the magnetic field surrounding the body, using a combination of accelerometers and gyroscopes, sometimes also magnetometers. The IMU computation may be based on a number of sensors giving input to the measurement unit, like Accelerometer, Gyroscope and Magnetometer. Other sensors, such as the Barometric pressure sensor is also a sensor that can be used, but is normally not regarded as part of the IMU.

An accelerometer measures the acceleration of the mobile device, by measuring the forces affecting the accelerometer sensor. The measurements returned may be expressed in speed per second (in m/s2). The acceleration is normally related to the 3 axes (x,y,z) of the device coordinate system.

A gyroscope measures the angular velocity around the three axes of the phone. The measurements returned may be expressed in degrees or radians per second, and indicate how the mobile device is rotating. Integrating the gyroscope output provides the total change in angle during the integration time.

A magnetic sensor measures the strength and direction of the magnetic field affecting the phone in three axes. The measurements may be expressed in micro-Tesla An Inertial Navigation System (INS) estimates the position and orientation of a moving body by continuously tracking the output from a number of sensors in an Inertial Measurement Unit (IMU) attached to the body of a mobile device. An IMU equipped INS forms the backbone for the navigation and control of many commercial and military vehicles such as cars, manned aircraft, missiles, ships, submarines, and satellites. Besides navigational purposes, IMUs serve as orientation sensors in many consumer products. Almost all smartphones and tablets contain IMUs as orientation sensors. Other example of products using an IMU is the Segway personal transporter, where the IMU is the central part of the balancing technology.

In order to be able to use an IMU for navigation and relate sensor input to geographical position, a well-defined coordinate system as reference is needed. This could consist of 3 axes related to the planet earth defined by longitude, latitude and an axis that points towards the sky. Another coordinate system can also be based on the representation of the corridors of a building. It is typically suitable for indoor positioning.

The orientation of the mobile device itself also needs to be defined in three directions, (x,y,z), which then is related to the defined co-ordinate system to determine the orientation and movements of the mobile device. Pedestrian Dead reckoning (PDR) is a method that uses the input from the sensors in the IMU. PDR calculates a new position of a mobile device such as a mobile phone carried by a person, based on current position and recognizing the steps taken by the person. PDR can be used as a complement to other navigation methods, like GNSS based, or cellular based, e.g. OTDOA etc.

For a radio mobile device operable to communicate in a radio communication network, an IMU included in the mobile device gives a good opportunity for a positioning node in the network, such as an E-SMLC, to utilize device-assisted IMU positioning estimate for hybrid positioning with other positioning methods to enhance the precision and reliability in the location estimate, or just utilize the device-based IMU positioning estimate, when cellular and GNSS based positioning methods are limited.

In one embodiment IMU related information is used for remote control of unmanned vehicles. This may be used to get detailed information on the movements of the unmanned vehicle and also to enhance the positioning accuracy. Such an embodiment may provide more precise positioning accuracy, so as to be able to track the movements of the vehicle in more detail. Potentially even more important, information from the IMU may be used in a control mechanism for the unmanned vehicle, such as an unmanned UAV, Aerial Vehicle, when remote piloting us used. Remote piloting could be e.g. a person in a control station out of sight of the vehicle, is controlling the movements of the UAV. There might also be situations where a vehicle is running on autopilot, and detailed tracking information is needed in the control center. Unmanned vehicles such as flying drones are normally moving rather fast, but changes in direction both horizontally and vertically are even faster, with very quick turns and altitude changes. This movement may be difficult for a GNSS or OTDOA based positioning system to follow.

According to one aspect, a method is provided for adaptive IMU data reporting from a mobile device to obtain positioning with an accuracy and/or speed depending on mobility and latency requirements.

FIG. 1 schematically illustrates a scenario where a mobile device 10 is present in communication range of a radio communication network 1. The radio communication network 1 comprises a plurality of base stations 20-22, connected to a network backbone 60. The device 10 is mobile and may be served by one base station 20 in one cell of the radio communication network 1. The mobile device 10 may be a vehicle, such as an unmanned vehicle, e.g. a drone. The mobile device 10 may as such be associated with a control center 40. The control center 40 may serve to guide and/or control the mobile device 10 by means of a control transmitter 41. The control transmitter 41 may be used to operate the mobile device 10 with control and/or guiding signals, which may be transmitted through the radio communication network 1, or through a separate channel, e.g. over a radio frequency or optical channel, or over a satellite link. The control center may also include a monitoring unit 42, operable to assist the control transmitter 41, wherein the monitoring unit 42 may include a memory for storing and a monitor for displaying data related to the mobile device 10, such as position, movement, heading, speed, events carried out by the mobile device 10 and data captured by and relayed from the mobile device 10.

Figure 2:
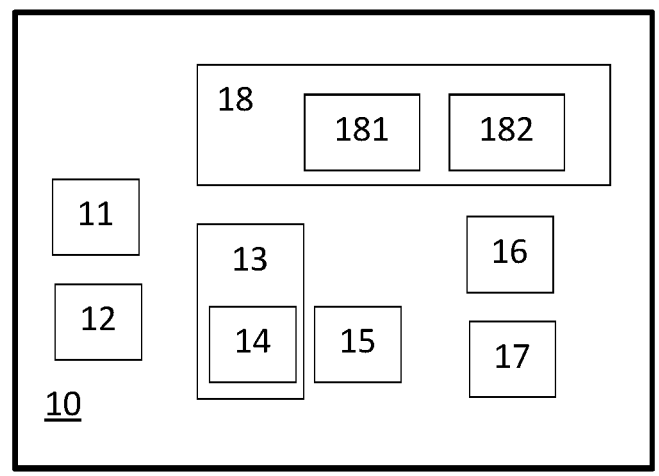
FIG. 2 schematically illustrates a radio mobile device configured to be operable in a system of FIG. 1.

FIG. 2 schematically illustrates an embodiment of the mobile device 10. The mobile device 10 may include a radio unit 11 for connecting with a base station 20-22 of the radio communication network 1. The mobile device 10 may optionally also include a separate transceiver 12 for communicating with the control transmitter 41 of the control center 40 over other channels than through the radio communication network 1.

The mobile device 10 may comprise a data collecting unit 13, which includes one or more sensors 14 for obtaining inertial measurement data, such as e.g. accelerometer, gyroscope and magnetometer etc. In such an embodiment, the data collecting unit 13 may realize an IMU. The data collecting unit may also comprise a processor for processing raw data obtained by the sensors 14. The data collecting unit 13 may be connected to the radio unit 11, for obtaining positioning data in the form of e.g. PRS signals for OTDOA, from base stations 20-22 of the radio communication network 1, or corresponding positioning signals from a wifi AP or a Bluetooth transmitter (not shown). The mobile device 10 may also comprise a satellite receiver unit 15 for receiving positioning data in the form of signals from GNSS satellites 30.

The mobile device 10 may further comprise a motor system 16, including a driving unit for propelling and steering the mobile device 10, such as wheels, wings, propellers or the like. The mobile device 10 may in such an embodiment be an unmanned vehicle. The mobile device 10 may further comprise a battery 17 or other power source.

The mobile device 10 may further comprise a control unit 18, including at least one processor 181 for controlling operation of the mobile device 10, and a memory 182 for storing computer program code executable by the processor. The control unit 18 is operable to retrieve and communicate positioning data from inter alia the data collecting unit 13, the satellite receiver 15 and the radio unit 11. Obviously, the mobile device 10 may comprise further elements, such as additional sensors for obtaining e.g. images and audio, tools, and a user interface such as a display and a data input device, and connectors.

In one embodiment, the mobile device 10 is operable to send positioning data including GNSS or OTDOA positioning information to a positioning node 61 included in or connected to the network backbone 60 of the radio network 1, such as an E-SMLC, Evolved Serving Mobile Location Center in an example of an LTE network 1. Such positioning data may be used in the positioning node 61 to calculate a fix position, or several fix positions, associated with the mobile device 10. In addition, the mobile device 10 may be configured to transmit inertial measurement data, such as IMU raw data, obtained by means of the data collecting unit 13. Such inertial measurement data is typically captured at a much higher repetition frequency than the positioning information for obtaining a fix position.

In one embodiment, the positioning node 61 may initiate a procedure for positioning the mobile device 10. This may e.g. be triggered by request from the control center 40. As one alternative, positioning initiation may be carried out by the positioning unit 61 directly, e.g. in case of an emergency event (e911 calls). The initiation of positioning of the mobile device 10 may triggered by a request from an external unit 50, communicatively connected to the positioning unit 61, such as in a surveillance situation where a moving mobile device 10 needs to be tracked by e.g. police or other party.

In one embodiment, a radio session is established for receiving positioning data in the positioning node 61 from the mobile device 10. The positioning functionality may thus be initially commanded from the positioning node 61 via the LPP protocol, LTE Positioning Protocol, as provided in 3GPP technical specifications 36.355/305, wherein the radio session is an LPP session.

Figure 3:
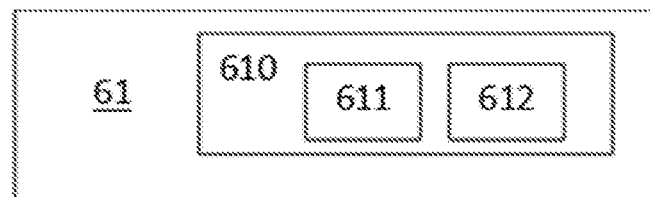
FIG. 3 schematically illustrates a positioning node configured to be operable in a system of FIG. 1.

According to one general aspect, covering at least the examples outlined herein and as exemplified in FIG. 3, a positioning node 61 in a radio network 1 is provided, configured for providing positioning data associated with a mobile device 10 including a radio unit 11, the positioning node 61 comprising a control unit 610 including a processing device 611, and a memory 612 storing computer program code; wherein the processing device is configured to execute said computer program code to carry out the any of the steps as exemplified herein. This includes, inter alia, the steps of establishing a radio session for receiving positioning data in the positioning node 61 from the radio unit 11; transmitting report control data to the radio unit 11, wherein the report control data identifies a request to report positioning data obtained in the device 10, wherein said positioning data includes inertial measurement data; and receiving positioning data from the radio unit in accordance with the report control data.

As generally provided above and as will be outlined for various different embodiments, the positioning node 61 may be configured to transmit report control data to the mobile device 10 in the radio session. In general terms, the report control data is a control signal or data, conveyed to the mobile device 10, and acts as a request for the mobile device 10 to obtain and report positioning data, including at least inertial measurement data. The report control data may thus identify which type of inertial measurement data that is to be obtained and reported, and whether pre-processed or raw data is to be reported by the mobile device 10. The report control data may also control when, how frequent, and when not positioning data including at least inertial measurement data is to be obtained or reported. The report control data as received in the mobile device 10 is configured to identify a request for the mobile device 10 to report positioning data obtained in the mobile device 10. The request may be more or less explicit, wherein the report control data defines e.g. type and update frequency of the positioning data. In other embodiments, the request may be implicit, wherein the report control data e.g. makes reference to a predetermined scheme for reporting positioning data, as defined by e.g. System Information Block (SIB) information or prescribed by a standard. In yet another embodiment, the report control data may be an acknowledgement of a uplink signal from the mobile device 10, wherein the request is a confirmation of data or a suggested report format conveyed or indicated in the uplink signal. The uplink signal may explicitly identify the character of the positioning data to be transmitted, such as type and frequency, or make reference to a predetermined scheme for reporting positioning data. In a preferred embodiment, the report control data identifies a request for positioning data obtained in the mobile device 10, wherein said positioning data includes inertial measurement data, which may be collected by data collecting unit 13 from one or more sensors 14 connected thereto.

Responsive to the request identified upon receiving the report control data by means of the radio unit 11 in the mobile device 10, the mobile device 10 starts to collect and transmit positioning data, e.g. by measurement streaming, in a single report, or batch wise. Positioning data including inertial measurement data is thus output to the positioning unit 61, e.g. an E-SMLC, over the radio session, e.g. using the LPP protocol. The positioning data preferably also includes data obtained in the data collection unit 13 usable for establishing a fix position, e.g. by means of GNSS or OTDOA.

In one embodiment, the inertial measurement data may be raw data. As an alternative, the inertial measurement data may be pre-processed in the data collecting unit 13 or by means of processing unit 18, wherein the pre-processed data may include e.g. velocity and direction.

In one embodiment, the positioning node 61 may forward positioning information, e.g. over LPP, to the control center 40. The positioning information may include received IMU pre-processed or raw data, together with a fix position obtained in the positioning node 61 by e.g. OTDOA or GNSS, based on associated positioning data received from the mobile device 10. For an LTE deployment, a new interface is thereby provided between an E-SMLC 61 and the control center 40. e.g. for providing IMU output.

In one embodiment, the request for positioning data obtained in the mobile device 10 may include at least an identification of a report interval, which may be indicated as a measurement update frequency, for the radio unit to 11 obtain or send positioning data. Dependent on the scenario, different report intervals may be employed for inertial measurement data and for fix positioning data, usable for e.g. GNSS or OTDOA positioning. In OTDOA system, fix positioning data can be the positioning measurement results, for example Reference Signal Time Difference (RSTD) measurements. The positioning node 61 may calculate the fix point position (e.g. geographic coordinate) based on this measurement. In an exemplary embodiment, a longer interval is applied for obtaining fix positioning data than for obtaining inertial measurement data. In one embodiment, this is determined in the control center 40, and may be conveyed to the mobile device 10 through the positioning node 61. In another embodiment, the determination to set or change report or obtainment interval for inertial measurement data and/or fix positioning data, may be carried out in the positioning node 61 of the network 1 or in the control canter 40, and conveyed to the mobile device 10. A decision and report to change inertial measurement interval may be carried out based on a required positioning accuracy, and may be automated or manually controlled.

In a preferred embodiment, positioning data received from the mobile device 10 includes a timestamp associated with at least the inertial measurement data. In one embodiment, a timestamp may be included in the positioning data for each collected sample of inertial measurement data in the mobile device 10. In an alternative embodiment, a single timestamp may be requested for a batch of samples of inertial measurement data, obtain with a certain specified or predetermined update frequency. By obtaining a timestamp, the positioning node 61, or the control center 40, may correlate obtained inertial measurement data to any fix positioning point, based on e.g. OTDOA or GNSS, which may be inherently associated with a timestamp or otherwise provided with additional timestamp data. Positioning by means of inertial measurement data provides only a relative position, but by associating such relative movement, obtained with a high update frequency, with more scarcely obtained fix positions, by using correlation of timestamps, errors or inaccuracy in the positioning based on the inertial measurement data may be decreased. Timestamp data may e.g. be established in the mobile device 10 from a clock signal received from the radio unit 11 or from satellite signals received by satellite receiver unit 14. The mobile device 10 may also, or alternatively, include a local clock signal generator, e.g. included in the processing unit 18, configured to generate a clock signal to establish a timestamp. In one embodiment, the processing unit 18 may be configured to establish a timestamp based on a clock signal, e.g. as a delay value or an offset.

In one embodiment, obtained positioning data is fed into a tracking system operated by the monitoring unit 42 in the control center 40, to provide a trajectory of the movements of the mobile device 10. In one embodiment, obtained positioning data used in the monitoring unit 42 to give support to a remote pilot, controlling a mobile device in the form of an unmanned vehicle 10.

In one embodiment, positioning data including inertial measurement data obtained from a mobile device 10 may be used in a method for prediction of direction and/or speed of the mobile device 10. This may be usable e.g. when reception of positioning data is lost, after one or more samples of positioning data, including both fix positioning data and inertial measurement data, has been received in the positioning node 61. By correlating timestamp data from the fix positioning data and the inertial measurement data, direction and speed at e.g. a last calculated fix position may be determined. This may e.g. be used for assessing a true position or heading at a later point in time, by extrapolation.

Figure 4:
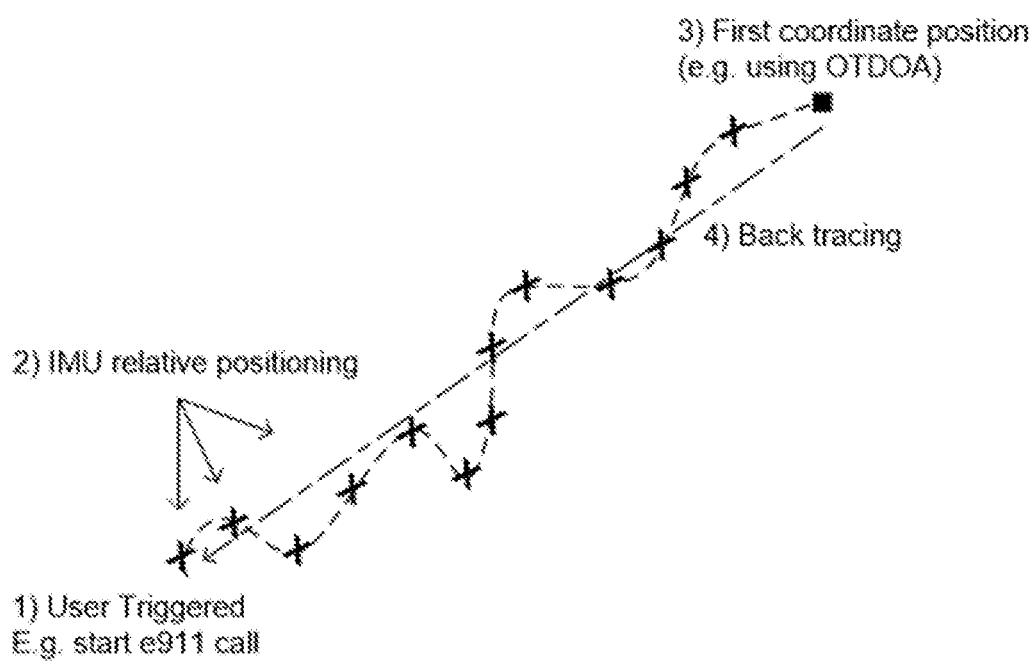
FIG. 4 schematically illustrates an exemplary embodiment of a method for backtracking to a preceding position.

FIG. 4 schematically illustrates an embodiment, in which reporting of inertial measurement data from a mobile device 10 may be used in a method for backtracking movement of the mobile device. This may e.g. be used for determining an original position, when a fix position determination is not or cannot be made until at a later stage. The drawing shows an example of a method in a radio network 1 for backtracking a moving mobile device 10, including a radio unit 11 for communicating with the network 1, including at least the following steps:

1. Receiving a connection attempt in the network 1 from the mobile device. The connection attempt may be a call, a message, a distress signal, or just initiation of any such connection. This may be initiated by a user present with the mobile device, or by a remote user, or e.g. automatically by the mobile device 10 itself responsive to occurrence of an event detected by the mobile device 10, such as loss of reception of fix positioning data.
2. The mobile device is thereby configured to compile inertial measurement data, obtained from one or more sensors 14 in the mobile device 10. The compilation of inertial measurement data may be a standard setting, and always performed with a certain interval. As an alternative, such compilation is triggered by a certain type of event, such as exemplified under point 1, or e.g. in response to the connection attempt being made, such as an emergency call or signal, as indicated in the drawing.
3. The mobile device may not have immediate access or possibility to obtain fix position measurement data upon making the connection attempt, which may also be the trigger for compiling the inertial measurement data. This may e.g. be caused by the mobile device 10 being present indoors or otherwise having poor connection possibilities. Another example may be that a unit 14 in the mobile device 10 for receiving fix positioning data from a remote positioning data transmitter, such as a GNSS satellite 30, is not functioning or is inactive when the connection attempt is made. For this reason, the mobile device may have moved from a first position indicated at 1) in the drawing, since making the connection attempt, to a second position indicated at 3) in the drawing, when a fix position can be obtained for a first time since the connection attempt, using e.g. OTDOA or GNSS.

4. When fix positioning data is received in a positioning unit 61 included in or connected to the network 1, also the compiled inertial measurement data is reported from the mobile device 10. Once a first fix position has been determined, a backtracking calculation may be carried out, using received inertial measurement data which includes timestamps associated with obtainment of the inertial measurement data. This backtracking provides, as an output from the positioning node 61, position information related to the point or area where the connection attempt was made.

With reference to this example, a general method is provided in a radio network for backtracking a moving mobile device including a radio unit for communicating with the network, including performing, in the radio network, the steps of detecting a connection attempt from the radio unit;

receiving positioning data with associated timestamp data from the mobile device, including fix positioning data obtained in the mobile device from a remote positioning data transmitter in connection with the connection attempt, and inertial measurement data obtained from a sensor provided in the mobile device from the radio unit after the connection attempt;

determining a first position based on the fix positioning data; and determining a second position corresponding to a position from which the connection attempt was made, based on the determined first position and the inertial measurement data and associated timestamp data.

In various embodiments associated with the embodiments already described herein, a selection mechanism is included for establishing a user plane connection. Referring again to FIG. 1, an LPP session may be set up between the radio unit 11 in the mobile device 10, over a serving base station 20, to the positioning unit 61, which may be connected over a mobile management entity MME (not shown) in an LTE deployment. However, a user plane connection may alternatively be set up as a data connection directly between the mobile device 10 and the control center 40, such as over a gateway unit 62 or similar. In various embodiments, this is carried out dependent on requirements or specific request from the control center 40 based on various indication related to the mobility of the mobile device 10, such as degree or speed of movement, or e.g. initiated by the positioning node 61 itself. Such a user plane connection thus establishes a direct connection between the mobile device 10 and the control center 40, where communication is carried out without passing or involving the positioning unit 61.

In one embodiment, the selection mechanism for user plane connection may be controlled by positioning latency requirements. If inertial measurement data is used for controlling or monitoring movements of the deice 10 in the control center 40, a mechanism is usable for selecting whether IMU raw-data shall be transferred via the positioning node 61, or directly to the control center 40 via user plane connection, such as when a low latency requirement exists, or that a present latency is not deemed acceptable. The reason for this may e.g. be that a lag is experienced in the control center 40, between guiding or control signals initiated at the control center 40, and actual movement or other execution of actions in the mobile device 10. This may e.g. be determined from response signals from the mobile device 10 to the control center 40, such as acknowledgement, ACK, signals or e.g. video or audio signals captured and transmitted by the mobile device 10 to the control center 40. Determination that a level of latency is not acceptable in a normal LPP connection may be user determined, or automatic based on a comparison between transmitted control signals and received signals or monitored action taking place in the mobile device 10.

In an embodiment or situation where IMU data, such as inertial measurement data, is transferred via the direct user plane connection, a control mechanism of a processing unit connected to the control transmitter 41 and/or the monitoring unit 42 in the control center 40 is preferably configured to use timestamp data when combing the IMU data with fix point information received from the positioning node 61, established by e.g. OTDOA or GNSS based on fix point positioning data reported from the mobile device 10.

Depending on latency requirement or level of mobile device 10 movement, a selection may in one embodiment also be made on the most suitable radio access technology, such as e.g. LTE, NR (New Radio). Suitable indication in RRC signaling may be used for this selection.

Figure 5:
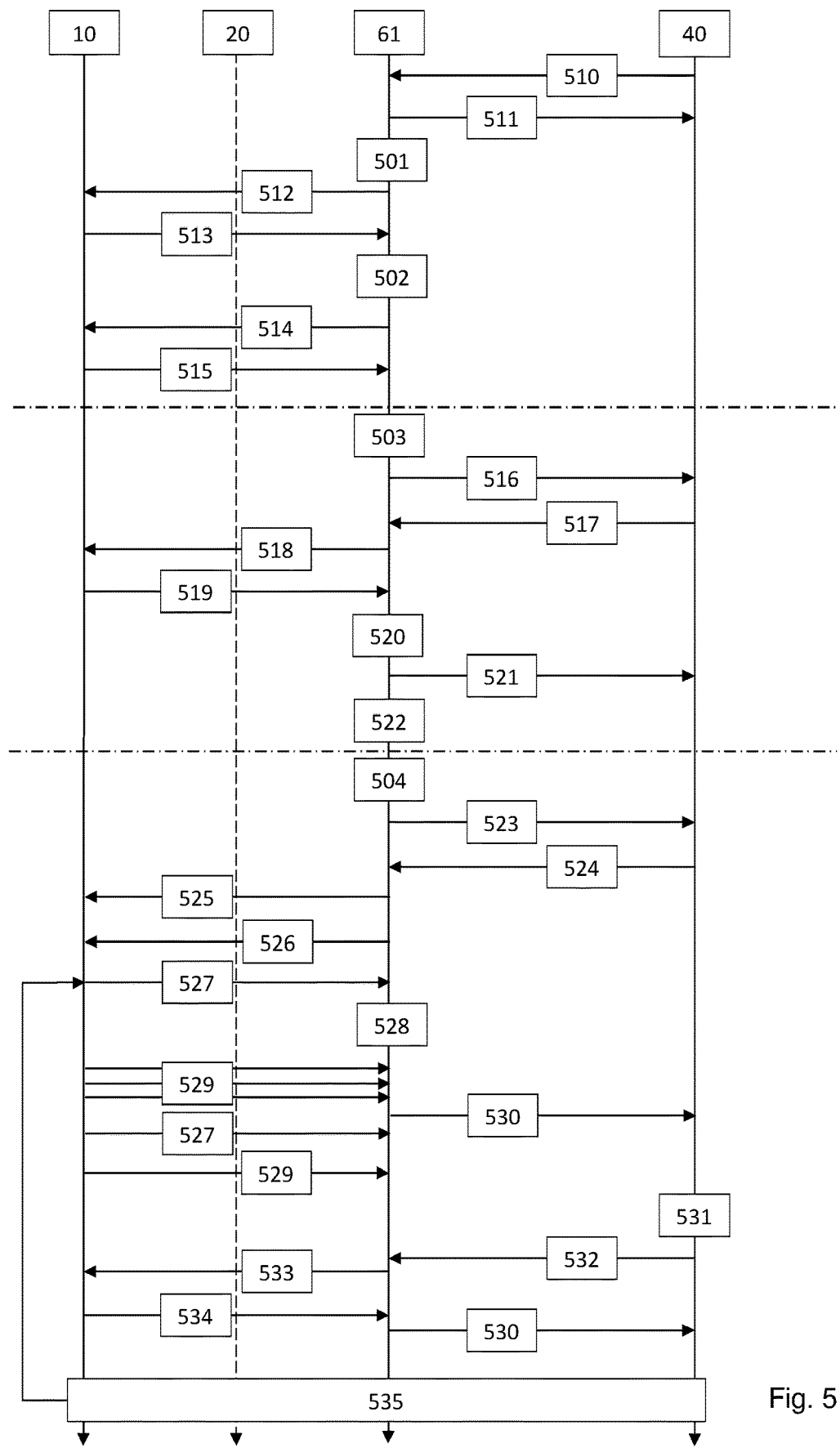
FIGS. 5 and 6 schematically illustrate signaling mechanisms disclosing several embodiments of various methods as provided herein.
Figure 6:
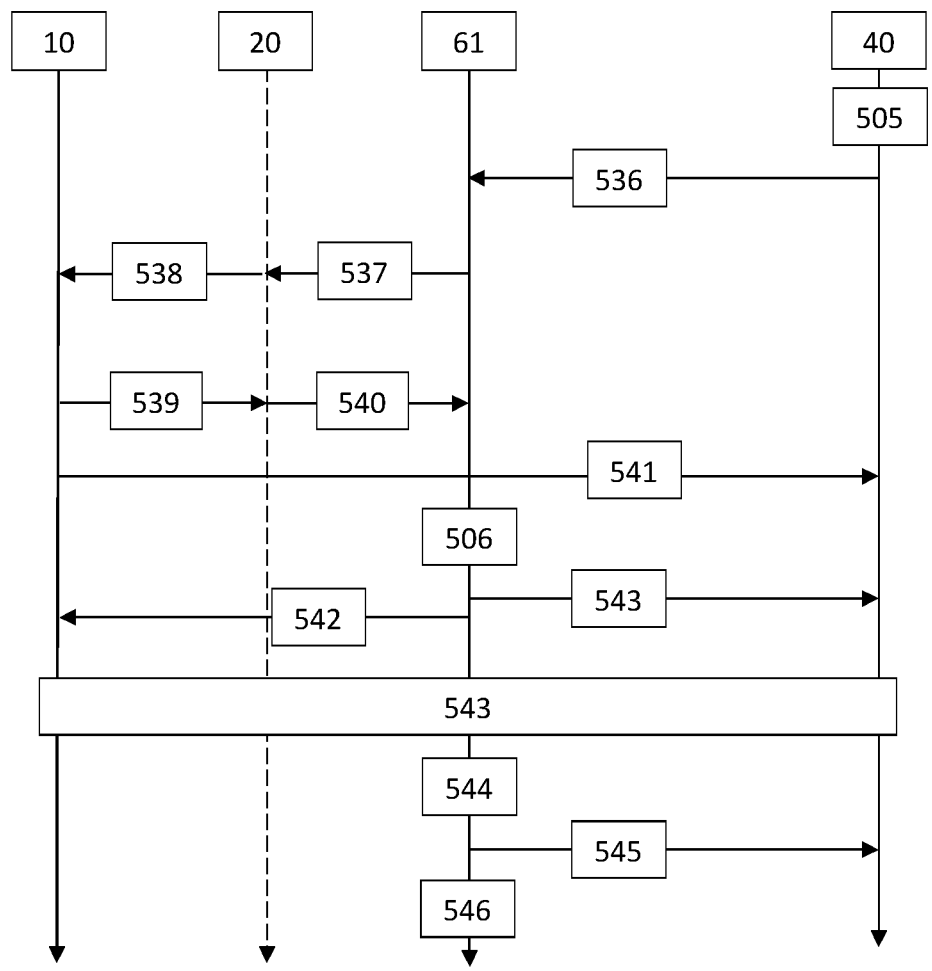

FIGS. 5 and 6 schematically illustrate various instances 500 of a signaling mechanism according to different embodiments provided herein. The schemes exemplified in the diagrams of FIGS. 5 and 6 may be read and understood in conjunction with the previous drawings and associated description.

In the drawings of FIGS. 5 and 6, the mobile device 10, e.g. an unmanned vehicle 10, is illustrated to the left. The positioning node 61 is center, and a base station 20 is indicated between them. To the right, a control center 40 for controlling and/or monitoring the mobile device 10 is shown. In an LTE deployment, the mobile device 10 may include a radio unit 11 realizing a UE, and the base station 20 could be an eNB (Evolved NodeB). In a 5G NR deployment, the base station 20 could be a gNB. The positioning node may be an E-SMLC. The embodiment of FIG. 5 provides OTDOA as an example for fix positioning, but in alternative embodiment fix positioning may be obtained by e.g. GNSS, wifi or BT.

In an initial step 510, a positioning request may be transmitted from the control center 40 to the positioning node 61, which may respond or acknowledge 511 the request.

In a process indicated as 501 in the drawing, a process for checking mobile device 10 capability is carried out. In one embodiment, report control data 512 may be transmitted from the positioning node 61, e.g. in RRC, to the radio unit 11 in the mobile device 10, indicating a request for device capability reporting. The request may be explicit or implicit, such as a signal bit or code representing such a request. A response report 513 back from the mobile device 10 may also be explicit or implicit, and may e.g. provide indication of support for sensor raw data reporting as such, indication of type of sensors available for providing inertial measurement data, such as support or no support for accelerometer, gyroscope, magnetometer etc.

In one embodiment, indicated as 502 in the drawing, a device mobility check may be performed. This may be carried out by establishing a radio session between the positioning node 61 and a radio unit 11 in the mobile device 10, e.g. over LPP, and requesting 514 an indication of mobility of the mobile device 10. This may be obtained in the mobile device by using one or more IMU sensors. The mobile device 10 may provide a response 515 to the positioning node 61, which response may indicate mobility as a yes or no option, or e.g. a level of mobility as determined from the built-in sensors.

In one embodiment, as indicated by 503 in the drawing, it may be concluded that the mobile device 10 is stationary, e.g. in response to the outcome discussed with reference to 502, e.g. from the response 515. The positioning node 61 may query 516 the control center if only a fix position, or a fix position with IMU raw data is to be reported for the mobile device 10. After receiving a response 517 from the control center 40, the positioning node 61 may request 518 the mobile device 10 to obtain fix positioning data 519, such as based on PRS signals for OTDOA, and potentially also a batch of IMU data. In the positioning node 61, a fix position is calculated 520, where applicable an IMU-enhanced fix position, which may subsequently be reported 521 to the control center 40. This may be repeated 522 based on e.g. a requirement on accuracy, e.g. if the obtained accuracy is insufficient.

In one embodiment, as indicated by 504 in the drawing, it may be concluded that the mobile device 10 is moving, e.g. in response to the outcome discussed with reference to 502, or after repeated procedure under 503. In one embodiment, the positioning node 61 may thus be configured to determine an update interval of positioning data. Various intervals may be predetermined by specification or a previous setting communicated to the mobile device 10, dependent on a certain level of mobility or accuracy requirement. Alternatively, the positioning node 61 may determine one or more intervals based on detecting the level of mobility or accuracy requirement. Intervals may also be preconfigured by the control center 40, and communicated to the positioning node 61, for application dependent on level of mobility or accuracy requirement. The positioning node 61 may query 523 the control center if only a fix position, or a fix position with IMU raw data is to be reported for the mobile device 10. After receiving a response 524 from the control center 40, or determining an acknowledgement, the positioning node 61 may request 525 the mobile device 10 to obtain fix positioning data, such as PRS signals for OTDOA, with a first interval, and request 526 the mobile device 10 to obtain inertial measurement data, e.g. IMU raw data, with a second interval. For both fix positioning data 527 and inertial measurement data 529, timestamp data may be provided by the mobile device 10. Preferably, a substantially higher sampling frequency is set for inertial measurement data, such that the interval for obtaining fix positioning data is 10-100 times the interval for obtaining inertial measurement data, as exemplified in the drawing. An interval set by the positioning node 61 may reflect obtainment and/or report of the positioning data. When fix positioning data is received in the positioning node 61, a fix position may be calculated 528. The fix position may be enhanced by also taking reported inertial measurement data 529 from the mobile device 10 into account. In such an embodiment, an IMU enhanced fix position may be reported 530 to the control center 40, with a certain defined periodicity as agreed or upon calculating the position. The IMU enhanced fix position is obtained by correlating the received timestamp data associated with fix positioning data and inertial measurement data. In an alternative embodiment, or upon request, a fix position is calculated in the positioning node 61, and reported 530 to the control center 40 together with received inertial measurement data and the associated timestamp data. The control center 40 may be configured to check 531 a level of mobility, latency or accuracy requirement, and decide to regulate the report interval for fix positioning data and/or inertial measurement data, and communicate 532 that to the positioning node 61. The positioning node 61, responsive thereto, may then send report control data 533 to the mobile device 10, updating the report interval. This data may be acknowledged 534 by the mobile device 10. The positioning node 61 may then continue to report 530 IMU-enhanced fix, or e.g. OTDOA fix plus raw IMU data at the new defined interval, in a continued repetitive manner 535.

In one embodiment, provided in FIG. 6 and indicated by 505 in the drawing, as an alternative or in addition to the control center 40 instructing 532 the positioning node to update a reporting interval, it may be determined in the control center 40 that a user plane connection is required. This may be based on a determined latency requirement for position reporting, e.g. if change in the latency is needed. The determination 505 of a need or request for a user plane connection may also be based on the control center 40 wanting to increase the granularity of a trajectory calculation or to improve feedback loop control for maneuvering control of the mobile device 10. A request 536 for user plane connection may be transmitted to or via the positioning node 61. A user plane connection is thereby set up in the radio communication network 1 by communication 537-540 between the base station 20 and the mobile device 10. Reporting of at least inertial measurement data may then be relayed 541 directly from the mobile device 10 to the control center 40, as described also with reference to FIG. 1 above.

In one embodiment, indicated as 506 in the drawing, the positioning node 61, potentially by instruction from the control center 40, may determine that a process for obtaining a fix position is not sufficiently accurate. The positioning node may then instruct 542 the mobile device 10 to update its fix positioning method. As an example, if OTDOA does not provide sufficiently accurate or fast fix positions, an instruction 542 may be conveyed in report control data from the positioning node 61 to switch to report GNSS fix positioning data. This information of change of positioning method may also be transmission 543 to the control center 40, or acknowledged if the change was originally requested by the control center 40. Reporting may subsequently be continued 543, similarly to what was outlined for step 535 in FIG. 5. The positioning node 61 may further determine 544 that calibration may be required, and report 545 that need to the control center 40. When no further reporting of positioning data is needed, reporting from the positioning node may be stopped 546.

Various embodiments have been out lined above, and it should be understood that these embodiments may be combined in any form that is not contradictory. The scope of the invention is only limited by the appended claims.

The invention claimed is:

1. A method for providing positioning data in a positioning node of a radio network, which positioning data is associated with a mobile device including a radio unit, the method comprising:
 establishing a radio session for receiving positioning data in the positioning node from the radio unit;
 transmitting report control data to the radio unit, wherein the report control data identifies a request that controls the mobile device to record a compilation of inertial measurement data obtained in the mobile device, and to report positioning data comprising the compilation of inertial measurement data; and receiving the positioning data reported from the radio unit in accordance with the report control data.

2. The method of claim 1, wherein the received positioning data comprises timestamp data associated with the inertial measurement data, for correlation of the compilation of inertial measurement data with fix positioning data.

3. The method of claim 1, further comprising:
transmitting a position indication including or based on the received position data to a control center associated with the mobile device.

4. The method of claim 3, further comprising:
receiving control data from the control center, wherein the control data relates to latency associated with calculating a position based on the received positioning data; and
establishing a user plane connection between the radio unit and the control center in response to receiving said control data.

5. The method of claim 3, further comprising:
receiving a request for user plane connection from the control center; and
establishing a user plane connection between the radio unit and the control center.

6. The method of claim 1, wherein said report control data identifies an interval for the mobile device to obtain or report at least the inertial measurement data.

7. The method of claim 6, further comprising:
determining a parameter level associated with mobility of the mobile device, based on the received positioning data,
wherein said report interval is set based on the determined parameter level.

8. The method of claim 7, further comprising:
receiving control data from a control center associated with the device, which control data relates to latency associated with calculating a position based on the received positioning data; and
establishing a user plane connection between the radio unit and the control center in response to receiving said control data.

9. The method of claim 7, further comprising:
receiving a request for user plane connection from a control center associated with the device; and
establishing a user plane connection between the radio unit and the control center.

10. The method of claim 1, wherein said the transmitting the report control data comprises:
transmitting report control data that identifies:
a first interval for reporting fix positioning data obtained in the mobile device from a remote positioning data transmitter; and
a second interval for reporting the compilation of inertial measurement data.

11. A positioning node comprising:
a control unit comprising:
a processing device; and
a memory storing computer program code,
wherein the processing device is configured to execute said computer program code to:
establish a radio session for receiving positioning data in the positioning node from a radio unit of an operatively associated mobile device;
transmit report control data to the radio unit of the associated mobile device, wherein the report control data identifies a request that controls the associated mobile device to record a compilation of inertial measurement data obtained in the mobile device, and to report positioning data comprising the compilation of inertial measurement data; and
receive the positioning data reported from the radio unit in accordance with the report control data.

12. The positioning node of claim 11, wherein:
the received positioning data comprises timestamp data associated with the inertial measurement data, for correlation of the compilation of inertial measurement data with fix positioning data.

13. The positioning node of claim 11, wherein the processing device is configured to execute said computer program code to:
transmit a position indication including or based on the received position data to a control center associated with the associated mobile device.

14. The positioning node of claim 11, wherein said report control data identifies an interval for the associated mobile device to obtain or report at least the inertial measurement data.

15. The positioning node of claim 14, wherein the processing device is configured to execute said computer program code to:
determine a parameter level associated with mobility of the associated mobile device, based on the received positioning data,
wherein said report interval is set based on the determined parameter level.

16. The positioning node of claim 13, wherein the processing device is configured to execute said computer program code to:
receive control data from the control center, which control data relates to latency associated with calculating a position based on the received positioning data; and
establish a user plane connection between the radio unit of the associated mobile device and the control center in response to receiving said control data.

17. The positioning node of claim 13, wherein the processing device is configured to execute said computer program code to:
receive a request for user plane connection from the control center; and
establish a user plane connection between the radio unit of the associated mobile device and the control center.

18. The positioning node of claim 11, wherein said report control data identifies
a first interval for reporting fix positioning data obtained in the of the associated mobile device mobile device from a remote positioning data transmitter; and
a second interval for reporting inertial measurement data.

19. A mobile device for communication with a radio communication network, the mobile device comprising:
a radio unit;
a receiver for receiving fix positioning data from a remote positioning data transmitter;
a data collecting unit comprising a sensor for obtaining inertial measurement data associated with movement of the mobile device; and
a control unit comprising:
a processing device; and
a memory storing computer program code,
wherein the control unit is configured to execute the computer program code to:
generate a compilation of the obtained inertial measurement data; and
establish at least one timestamp, for correlating the received fix positioning data with the compilation of the obtained inertial measurement data.

20. The mobile device of claim 19, wherein the control unit is configured to execute the computer program code to:
receive report control data, via the radio unit, wherein said report control data identifies:
a first interval for reporting fix positioning data obtained in the mobile device from a remote positioning data transmitter; and
a second interval for reporting inertial measurement data; and
transmit positioning data, via the radio unit, in accordance with the report control data.

* * * * *